United States Patent
Sabat, Jr.

(10) Patent No.: US 6,415,132 B1
(45) Date of Patent: Jul. 2, 2002

(54) BLOSSOM/WILT FOR DYNAMIC REALLOCATION IN A DISTRIBUTED FIBER SYSTEM

(75) Inventor: John Sabat, Jr., Merrimack, NH (US)

(73) Assignee: Transcept, Inc., Manchester, NH (US)

( * ) Notice: Subject to any disclaimer, the term of this patent is extended or adjusted under 35 U.S.C. 154(b) by 0 days.

(21) Appl. No.: 09/296,011

(22) Filed: Apr. 21, 1999

(51) Int. Cl.[7] ................................................. H04H 1/14
(52) U.S. Cl. ...................... 455/3.01; 455/436; 455/442; 455/450; 455/453; 725/62
(58) Field of Search ............................. 455/3.01, 436, 455/438, 439, 442, 443, 447, 450, 453, 509, 522, 63, 11.1; 725/62, 106, 114, 119

(56) References Cited

U.S. PATENT DOCUMENTS

| | | | |
|---|---|---|---|
| 4,144,411 A | | 3/1979 | Frenkiel ........................ 179/2 |
| 5,321,736 A | | 6/1994 | Beasley ........................ 379/58 |
| 5,381,459 A | * | 1/1995 | Lappington ................ 455/426 |
| 5,584,049 A | | 12/1996 | Weaver, Jr. et al. ........ 455/67.1 |
| 5,732,353 A | | 3/1998 | Haartsen ..................... 455/450 |
| 5,774,808 A | | 6/1998 | Särkioja et al. ............. 455/436 |
| 5,781,859 A | | 7/1998 | Beasley ...................... 455/423 |
| 5,822,324 A | | 10/1998 | Kostresti et al. ............ 370/487 |
| 5,831,976 A | | 11/1998 | Lin et al. .................... 370/329 |
| 5,867,763 A | * | 2/1999 | Dean et al. ................. 725/114 |
| 5,953,670 A | * | 9/1999 | Newson ....................... 455/454 |
| 6,023,625 A | * | 2/2000 | Myers, Jr. ................... 455/503 |

* cited by examiner

*Primary Examiner*—Nay Maung
*Assistant Examiner*—Temica M. Davis
(74) *Attorney, Agent, or Firm*—Hamilton, Brook, Smith & Reynolds, P.C.

(57) ABSTRACT

A technique for controlling a wireless communication network to provide for blossoming capacity to a relatively high capacity state and/or wilting capacity to a relatively lower capacity state. Connections in progress with active subscriber units are properly handled without the need to send explicit handoff commands from the base stations. The cell sites may be advantageously implemented with cable microcell integrators that comprise remotely deployed transceiving equipment that are interconnected to centrally located base transceiver station equipment via a broadband cable distribution network. In an initial relatively low capacity state, adjacent cells are operated at the same carrier frequency such that they form simulcast groups so that subscriber units traveling in adjacent cells will operate with the same radio channel. As demand increases, the power level of an auxiliary radio transceiver is gradually increased while the power level of the original transceiver in the cell is gradually decreased. Once the auxiliary transceiver is operating at full power on the second channel, the mobile units in the cell will have completed their internal soft handoff processing and switch over to the new channel. An analogous inverse process can be used to wilt the capacity of the system.

7 Claims, 8 Drawing Sheets

BLOSSOM/WILT FOR DYNAMIC REALLOCATION IN A DISTRIBUTED FIBER SYSTEM

BACKGROUND OF THE INVENTION

The present invention relates generally to wireless communication systems and in particular to a technique for dynamic allocation of remotely deployed transceiving equipment.

Wireless communication networks, such as cellular mobile telephone and Personal Communications Services (PCS), continue to enjoy wide spread growth and popularity. There is often times a need in such systems to provide increasingly greater call handling capacity, as well as to accommodate higher peak usage. Emerging PCS networks, presently still in the stages of being implemented, demand additional design considerations such as low build out cost as they must compete with entrenched cellular networks.

Several approaches have been adopted for deploying such networks. One approach is to increase the coverage area afforded by a given system by increasing the antenna tower height and transmit power level beyond conventionally accepted norms. However, such solutions often increase the number of "blind" spots in areas that include a number of tall buildings, hills, or other natural obstructions to radio propagation.

Alternatively, a relatively large number of base stations may be deployed with smaller radio coverage "footprints". While this avoids blind spots, it greatly increases the total capital cost for base station transceiving equipment which may be $200,000 or more per cell site.

Rather than deploy base station equipment in each relatively small cell (which would be relatively cost prohibitive), broadband distribution cable networks can be used to connect the antennas to centrally located base station equipment. For example, a suggestion has been made in U.S. Pat. No. 5,381,459 to use cable television networks to distribute wireless communication signals between base transceiver system (BTS) equipment and remote transceiver sites located at each cell. This approach couples the transceiver signals over an existing coaxial cable television network using time or frequency division multiplexing in order to avoid interference with other signals being carried, such as cable television signals.

Recently, other types of broadband distribution networks have also been proposed. Such networks consist of optical fiber transmission media which can directly distribute signals between centrally located base transceiver system (BTS) equipment and remotely located transceiver equipment. See, for example, our co-pending United States' patent application Ser. No. 09/256,244 entitled "Optical Simulcast Network with Centralized Call Processing," filed Feb. 23, 1999.

There is also presently a demand by the customers of such cellular telephone systems for digital modulation techniques, such as code division multiple access (CDMA). In these CDMA systems, such as the IS-95B system being used widely in the United States a common frequency band is used to support communication between multiple mobile subscriber units and base stations. With this technique, signals occupying a common carrier frequency are discriminated at a receiving terminal (which may either be the base station or the mobile unit) based on the use of pseudo random noise (PN) codes. In particular, transmitting terminals use different PN codes or PN code phase offsets to produce signals that may be separately received. The mobile unit is then provided with a list of carrier signal codes and phase offsets corresponding to neighboring base stations surrounding the base station through which communication is established. The mobile unit is also equipped with a searching function that allows it to track the strength of the carrier signals generated from a group of the neighboring base stations.

In this CDMA system, various methods exist for switching a mobile unit from one base station to another. These methods, known as "handoff," are an essential feature of cellular telephone systems which must support the ability to continue a telephone conversation in progress as a mobile unit moves between cells. The handoff method specified in the most popular CDMA system standards is called a "soft handoff." This method is considered "soft" in the sense that communication with the adjacent base station is established before communication is terminated with the original base station. While the mobile unit is communicating with both base stations, a single receive signal for the remote subscriber unit is created by combining the signals from each base station within the circuits located in the mobile unit. Similarly, the signals received from the mobile unit by both base stations are combined in a centralized system controller prior to being forwarded to complete the connection.

While soft handoff solves certain problems caused by the movement of mobile units between cells, other difficulties are encountered within such systems when they use broadband distribution networks to distribute signals between remotely located transceiver equipment and the centralized base station equipment. In such networks, it is desirable to utilize the sharing or "simulcast" of radio carriers in adjacent cells. This permits the most efficient use of radio transceiving equipment when the demand for use of the system is relatively low.

However, as traffic demand increases over short periods of time, such as when traffic patterns change during the course of a day, it becomes desirable to activate additional transceiving equipment in the cells. By enabling the "blossoming" of such radio coverage, the additionally activated transceiving equipment can handle the increased traffic load. Such equipment should be deployed in a way which avoids the need for the remote units to switch between carrier frequencies. In particular, it would be desirable to avoid having to interrupt a communication in progress to command a mobile unit to perform a "hard" handoff to switch to a different carrier.

In other words, the system should operate in a simulcast mode such that adjacent cells or sectors may use the same carrier and code phase offsets when the traffic density is relatively light. It would then be desirable to disable the simulcast as new capacity is needed, and to do this in a way which does not require modification of standard remote subscriber units such which are already in use.

SUMMARY OF THE INVENTION

Briefly, the present invention is a technique for handling changes in demand over short periods of time in a is wireless communication system. An optical fiber or other available broadband distribution network is used to distribute signals between Centrally located base transceiver station (BTS) equipment and remotely located transceiver equipment referred to herein as "cable microcell integrators" (CMI). The CMIs are deployed in a configuration such as one per cell (or cell sector) to provide radio frequency coverage in a pattern which approximates the eventual expected required deployment of base stations when the system is at full capacity.

With this scenario, a single radio carrier preferably carries the channelized radio frequency (RF) signals as a simulcast for a number of different CMIs. The same active traffic channels may therefore be broadcast to multiple CMIs and hence to multiple coverage areas during time periods of low demand. In this mode, multiple adjacent CMIs are configured to communicate with the mobile subscriber units using the same RF channel. A group of CMIs arranged in this manner are referred to as a "simulcast cluster." Simulcast clusters may also be defined by assigning other signal characteristics in common. For example, in CDMA systems, simulcast clusters are defined by assigning a common carrier frequency, common pseudonoise (PN) code, and common PN code phase offset. In comparison to traditional networks wherein the full capacity of an RF channel is not fully utilized, the coverage area of an RF channel may therefore be extended via the simulcast to provide a significant improvement in network efficiency.

In order to accommodate changes in traffic demand, such as may occur during a rush hour, a second RF channel is activated within the RF coverage area of at least one CMI. This second RF channel is provided by deploying an auxiliary CMI or auxiliary transceiver within the original CMI. The power level of this second RF channel is brought up gradually so that the system may rely upon the soft handoff features built into the subscriber units. In this manner, as the subscriber units acquire sufficient receive power from the second RF channel, a number of the subscriber units are automatically switched over to the second RF channel due to their own internal soft handoff processing.

In effect, the remote subscriber units are fooled, or "spoofed" into thinking that they are moving into a new cell, e.g., that they are moving closer to a base station in an adjacent sector operating with the second channel when, in actuality, they may not be moving at all. As a result, a subset of the mobile units within the cell will be switched over to the second carrier frequency, in effect splitting the traffic demand in the cell among the two carriers.

As traffic demand drops, such as towards the end of the rush hour, the power level of the second channel is slowly decreased. This causes the remote subscriber units in that section to begin to hunt for a stronger carrier which will be, for example, the original channel. At some point, they will switch over to the original channel, and the system returns to its original state.

Now more particularly, base station sector call capacity is initially distributed across the RF coverage area spanned by the simulcast of CMIs which are connected to the sector of interest. As caller demand increases, it is desired to transfer active calls to an additional base station sector without dropping or otherwise corrupting the calls. Simply reassigning one or more of the CMIs in simulcast mode to an auxiliary base station sector will add capacity within the RF coverage area in question, but it will also result in the dropping of mobile calls within the coverage area of the CMIs being reassigned. To remedy this, an auxiliary base station sector is first activated within the area of one or more CMIs in the simulcast. The original base station signal is then removed from that same area of one or more CMIs. This may be accomplished through the use of additional CMIs or by providing the CMIs with multiple RF carrier capability. As an example, consider a CDMA simulcast network of N CMIs distributing base station call capacity of K mobile calls across the simulcast. When call demand exceeds K calls within the region, it is desired to add another K call capacity within the region using the same RF carrier frequency but a different PN offset thus maintaining soft hand-off call capacity within the region of N CMIs. Eventually, the distributed network will have M CMIs simulcasting the auxiliary base station sector while N-M CMIs will be simulcasting the original base station sector. Abruptly switching the M CMIs to the auxiliary sector will drop mobile calls within the RF coverage area of the M CMIs being reallocated. In the present invention, the auxiliary sector (additional RF carrier at the same frequency but with a different PN offset) is activated at or near the location of the M CMIs being reallocated. In the preferred embodiment, the additional carrier is gradually increased to minimize the rate at which mobile calls begin soft handoff operations with the initial base station sector and the auxiliary base station sector.

As the auxiliary base station sector is activated at or near the M CMIs being reallocated, the initial RF carrier from the original base station sector is deactivated. In the preferred embodiment, the deactivation gradually lowers the forward link RF transmitted power levels to minimize the rate at which mobile calls terminate their soft handoff operations. When the addition of additional call capacity is complete, there is single RF carrier frequency radiated at any one CMI site, but M of them operate with the new PN offset and N-M of them operate at the original PN offset. This technique is not limited to the addition to a single base station sector within a CMI simulcast cluster, but can continue with the addition of a third base station sector. In the preferred embodiment, each sector is brought into the network one at a time. This limits the "spoofing" generated soft handoffs to two way handoffs.

When traffic demand decreases, the reverse operation is performed to remove the auxiliary base station sector from the simulcast cluster. At or near the locations of the M CMIs that are transmitting the auxiliary base station sector, the original base station sector is activated, thus initiating soft hand-off operations for all mobile calls within the area of RF coverage of the M CMIs. Then the RF carrier associated with the auxiliary base station is de-activated leaving all N CMIs in a common simulcast group connected to the initial base station sector.

For air interfaces other than CDMA, the operations are the same except that soft hand-off operations are not realized during the blossom and wilt transitions. However, the co-existence of the original and auxiliary carrier is still needed to prevent call drops. The overlap time for other air interfaces is used for call set-up to allow hard hand-off operations, which otherwise could not be executed. During the overlap period, the mobile makes carrier power measurements, e.g., performing mobile assisted hand off (MAHO), and both the original and auxiliary base station scanning receivers measure reverse link received signal quality prior to executing the hand-off decision.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
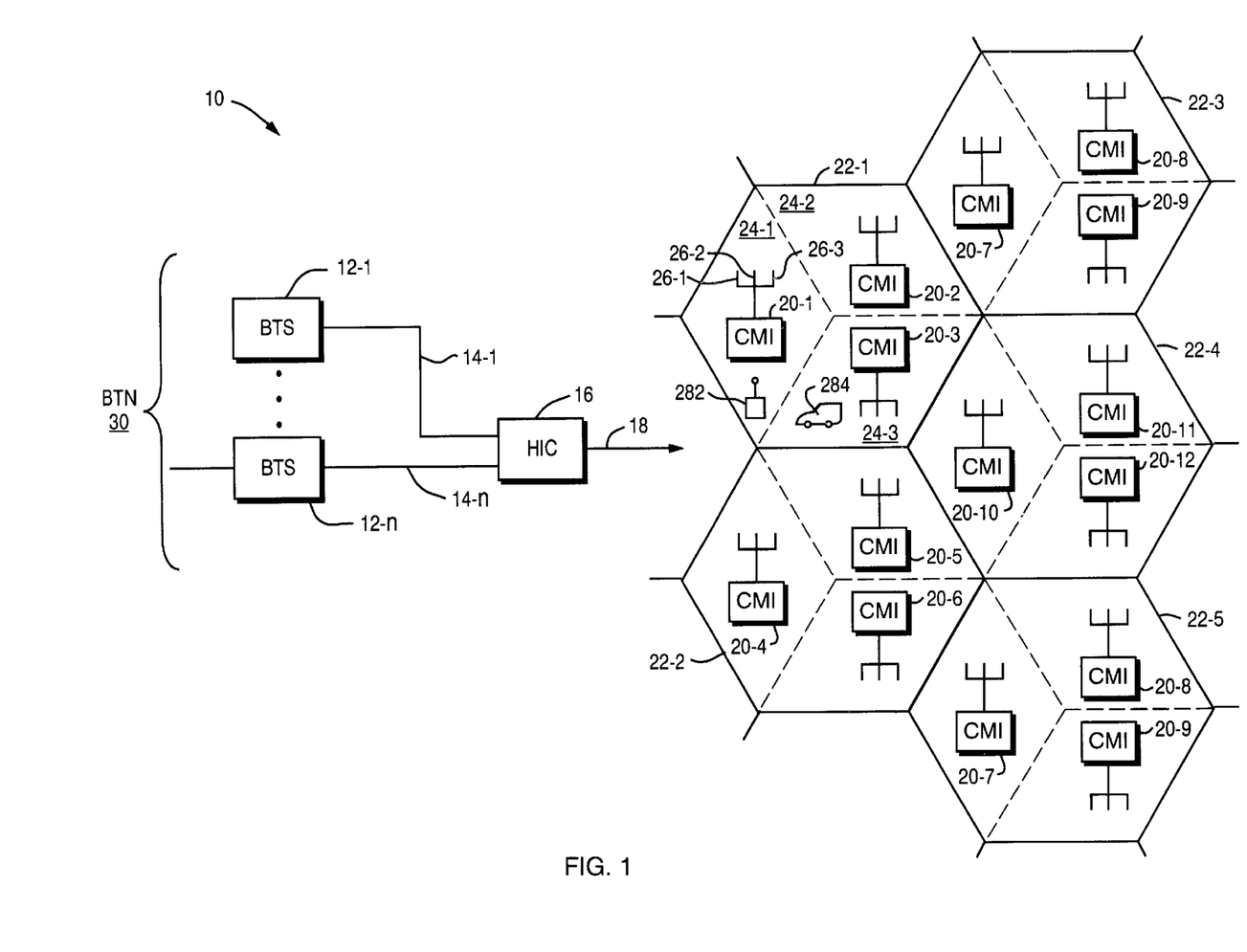
FIG. 1 is a block diagram of a wireless system making use of a broadband distribution network and radio channel activation scheme according to the invention.

Turning attention now to the drawings more particularly, FIG. 1 is a block diagram of the components of a wireless communication system such as a Personal Communication System (PCS), or other cellular mobile telephone system, in which a fiber optic distribution media 18 is used to distribute channelized radio frequency signals upbanded onto one or more optical carriers as one or more simulcast groups.

The system 10 includes one or more conventional base transceiver stations (BTSs) 12-1, ..., 12-n, a Hub Interface Converter (HIC) 16, and a number of Cable Microcell Integrators (CMIs) 20-1, 20-2, ..., 20-c. In the illustrated embodiment, an exemplary cell 22-1 is divided into three 120 degree sectors 24-1, 24-2, 24-3, and there is a corresponding CMI 20-1, 20-2, 20-3 deployed for each sector 24. It should be understood, however, that the principals of the invention described herein are equally applicable to non-sectorized cells and other types of coverage sites.

In this instance, each CMI 20-1 has associated with it typically three antenna elements 26-1, 26-2, 26-3 deployed in each of the sectors 24. The first antenna element 26-1 is used as a transmitter antenna. The second antenna element 26-2 is used as a primary reception antenna, and a third antenna element 26-3 is used as a secondary reception or diversity reception antenna.

Alternatively, in a microcellular type configuration, the cell 22-1 is divided into three microcells 24-1, 24-2, 24-3, in which case the antennas 26-1, 26-2, 26-3 are omnidirectional antennas located approximately in the center of each microcell 24. It should therefore be understood that when a "sector" is referred to in the following discussion, the same can be said for a microcell in the alternate embodiment.

The BTSs 12-1 ... 12-b are each coupled to the HIC 16 using appropriate radio frequency (RF) transmission media, such as coaxial cables 14-1, 14-n. The HIC 16 is physically located at the same centralized location as the BTSs 12.

However, the HIC 16 is also coupled to each of the remotely located CMIs 20-1, 20-2, ..., 20-c using an appropriate broadband distributed network 18. In the preferred embodiment, the distribution network is an optical fiber based network; it should be understood that other types of physical media such as cable television signal distribution networks may be used as well.

The system 10 provides voice and/or data traffic signals between subscriber units, such as a mobile subscriber unit 28-1 located in a vehicle, and hand-held subscriber units such as 28-2. Specifically, the system 10 provides traffic signals between subscriber units 28 and a network, such as the public switched telephone network (PSTN) 30. In a particular preferred embodiment of the invention are described herein, the signaling protocol (also known as the "air interface") between the base transceiver stations (BTS) 12 and the subscriber units 28 may, for example, be the Code Division Multiple Access (CDMA) IS-95B standard promulgated by the Telecommunications Industry Association (TIA) in the United States.

The CMIs 20 in the illustrated embodiment are each associated with a sector or microcell 24. For example, an exemplary CMI 20-1 is associated with a 120 degree sector 24-1 of a cell 22-1. CMI 20-1 is thus responsible for receiving radio signals from the subscriber unit 28-2 located within the sector 24-1 and forwarding them to one of the associated BTSs 12. Likewise, radio signals originating at one of the BTSs 12 and intended for subscriber unit 28-2 are forwarded through coaxial cable 14, HIC 16, over the optic fiber 18, to respective CMI 20-1.

The manner of activating specific frequency channels in a simulcast mode among multiple CMIs, and the manner of controlling the activation of additional channels (or "blossoming") and their deactivation (or "wilting") is the particular focus of the present invention. This will be discussed in detail in connection with FIGS. 6 through 8.

More particularly, in an initial state of the system 10, multiple CMIs 20 are arranged as a simulcast group such that the physical channels used to communicate with the subscriber units 28 in more than one cell or sector 24 are shared. For example, in one such embodiment, the CMIs 20-1, 20-2, 20-3 associated with sector 24-1 are sharing the same radio carrier frequencies, the same pseudorandom noise (PN) codes, and the same PN code phase offsets with the CMIs 20-4, 20-5, and 20-6 associated with another sector 24-2. In this simulcast mode, a single BTS, such as BTS 12-1, may therefore be used to service subscriber units 28 located in both sectors 24-1 and 24-2.

In the following discussion, it should be understood that when reference is made to a radio carrier signal, it implies a particular radio frequency, PN code, and PN code phase offset. In other words, in a CDMA system, the carriers which define individual radio channels are specified by a carrier frequency, a PN code, and a PN code phase offset.

Figure 2:
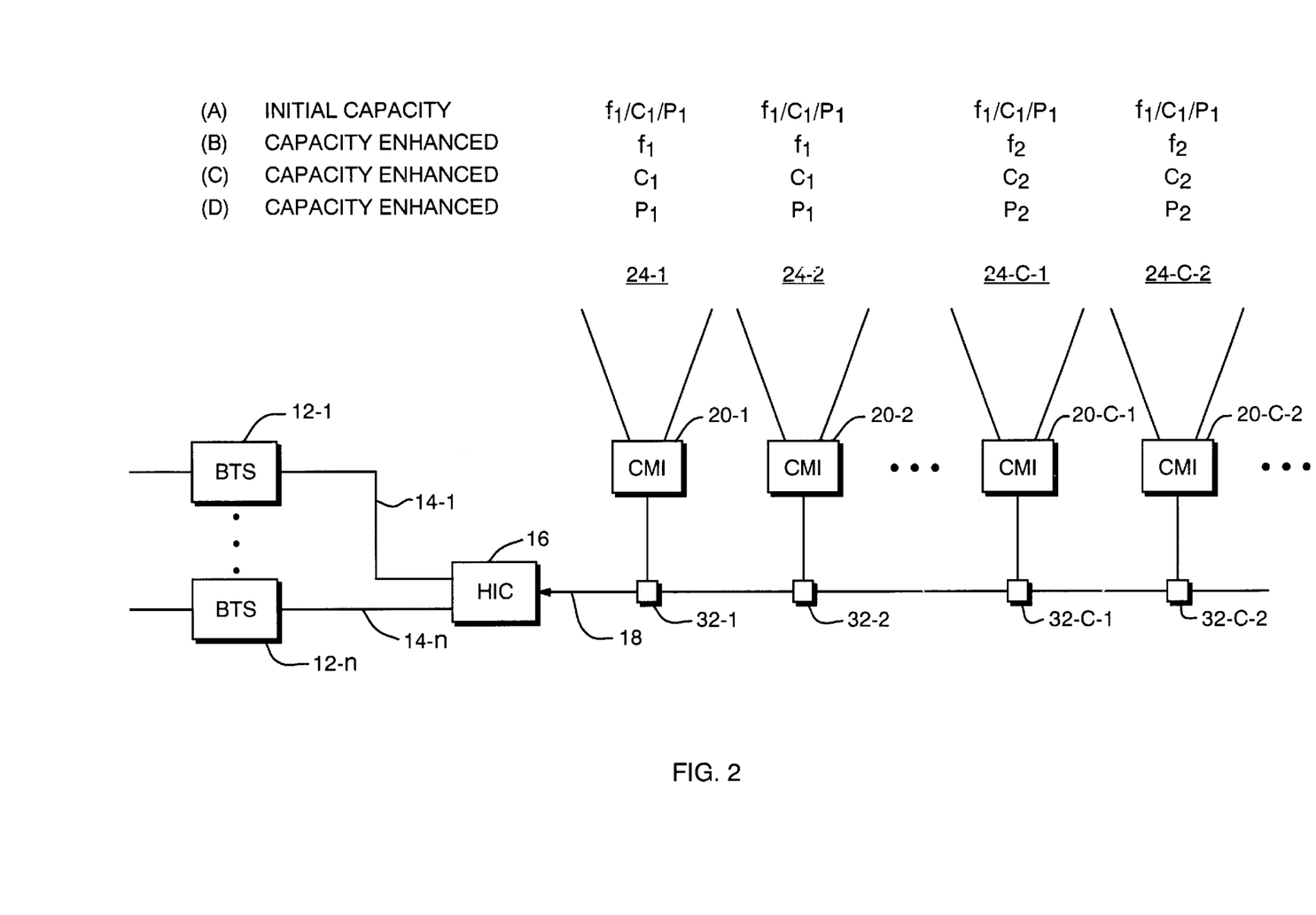
FIG. 2 is a circuit diagram of the distribution network showing how multiple CMIs are arranged to connect to the broadband distribution network.

Turning attention now to FIG. 2, the arrangement of the optical fiber 18 and its interconnection between the HIC 16 and various CMIs 20 will be discussed. In particular, each of the CMIs 20-1 is fed from an optical fiber 18 via a corresponding optical splitter 32-1, 32-2, ..., 32-c-1, 32-c. In this manner, the single fiber 18 is used to distribute a number of RF signals which may be modulated onto a single optical carrier wavelength to a plurality of the CMIs 20-1, 20-2, ..., 20-c.

In a forward link direction, a mode is supported wherein the same radio carrier signal is to be radiated within multiple sectors 24-1, 24-2, ..., 24-s of a particular simulcast group. This mode eliminates the need for coaxial cables, repeaters, and other radio frequency equipment that might otherwise be necessary to be deployed between various CMIs 20-1, 20-2, ..., 20-s in the sectors 24-1, 24-2, ..., 24-s. For the reverse link, the various optical couplers 32-1, 32-2, ..., 32-c efficiently sum the optically modulated carriers emanating from each corresponding CMI 20-1, 20-2, ..., 20-c. With this arrangement, a single centrally located BTS 12-1 may service a number of CMIs 20, therefore reducing initial build out cost.

Furthermore, as can now be better understood, a bank of centrally located BTSs 12-1, 12-2, ..., 12-n may use the common optic fiber 18 to distribute signals to a number of CMIs 20. Even at full capacity, there is a benefit to centrally locating the BTSs 12 in order to facilitate access for maintenance and logistics. In addition, in areas of hilly terrain and/or large numbers of tall buildings, link propagation distance may be naturally limited. Therefore, multiple CMIs 20 may be deployed in a configuration which optimizes radio frequency coverage while at the same time minimizing the need to deploy multiple BTSs 12.

As shown in the table at the top of FIG. 2, for a low capacity or initial system build out stage (A), the radio carrier signal f1 may be identical for each CMI 20-1, 20-2, . . . , 20-c. In a later capacity enhanced configuration (B), the sectors 24-1 and 24-2 may still constitute a simulcast group in which they are radiating with the same carrier signal f1. However, other sectors such as 24-c-1 and 24-c-2 may be assigned a different carrier signal f2 to form a second simulcast group. The two radio frequency simulcast groups may still be carried on a single optical carrier. Thus, by reassigning radio carrier signals, the traffic handling capacity of the system 10 is increased without the need to re-engineer the system for RF propagation, or to deploy additional antennas or radio transceiving equipment.

It should be understood that in a Code Division Multiple Access system 10, a second capacity increased configuration (C) may make use of the same carrier frequency as carrier f1 with a different pseudorandom code c1 or c2 for the different simulcast groups. In a third capacity enhanced scenario (D), the same frequency f1 and code c1 but a different code phases p1 and p2 may be assigned for the two simulcast groups.

Figure 3:
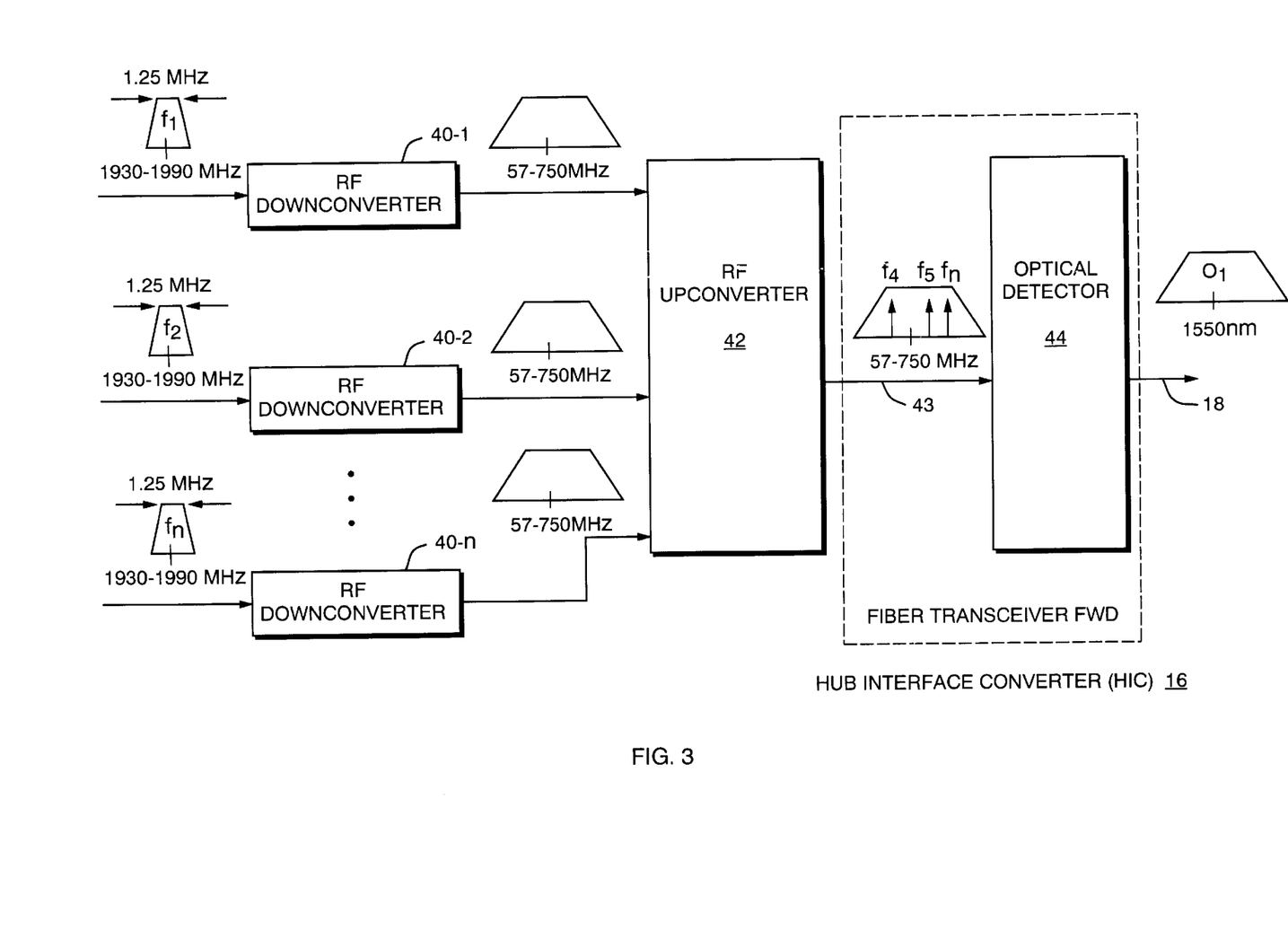
FIG. 3 is a more detailed block diagram of the forward link portion of a fiber node deployed at the central hub interface converter (HIC).

The HIC 16 is shown in more detail in FIG. 3. In this particular view, the portion associated with implementing the forward direction, namely the direction of transmission of signals from the BTSs 12 out to the CMIs 20, is illustrated. That portion is seen to include a number of RF down converters 40-1, 40-2, . . . , 40-n that couple to an RF combiner 42 which in turn feeds an optical modulator 44. The optical modulator 44 provides the forward link direction component of a fiber optic transceiver 45.

An exemplary RF down converter 40-1 receives the RF signals generated by an associated BTS 12-1 and translates their carrier frequency to a carrier frequency in a range more typical of cable distribution networks. In the illustrated embodiment, the RF down converter 40-1 accepts a 1.25 MHZ bandwidth signal, which according to the CDMA wireless interface standard in the forward direction may exist at an RF carrier in a range from 1930–1990 MHZ, and converts the RF energy to a lower intermediate frequency (IF) in the range of from, for example, 57–750 MHZ. In the illustrated embodiment, the BTS 12-1 has provided signals at a carrier frequency f1 in the range indicated and a second base station 12-2 has provided a signal of 1.25 MHZ at a different carrier frequency f2 but still within the forward link range of 1930–1990 MHZ typical of the PCS band.

There is typically a single RF down converter 40 associated with each BTS 12; however, it should be understood that various other scenarios are possible. For example, the function of the RF combiner 42 may be provided prior to the down conversion process implemented by the elements 40.

The RF combiner 42 accepts the down converted RF signals produced by the down converters 40-1 . . . 40-2 . . . 40-n to produce a single combined RF signal 43. The combined RF signal still contains signal components limited to within a 6 MHZ bandwidth within the range of 57–750 MHZ, containing the carrier frequencies f1, f2, . . . , fn. It should be understood in accordance with the above discussion that a given RF signal of 1.25 MHZ on a given carrier frequency f1 may actually contain multiple traffic channels implemented with different codes c1, c2, . . . , $c_Q$ or even code phases p1, p2, . . . , pz. The combined RF signal 43 is then provided to the optical modulator 44 and upbanded to an optical frequency such as at a carrier wavelength of 1550 nanometers (nm) appropriate for transmission over the optic fiber 18.

Figure 4:
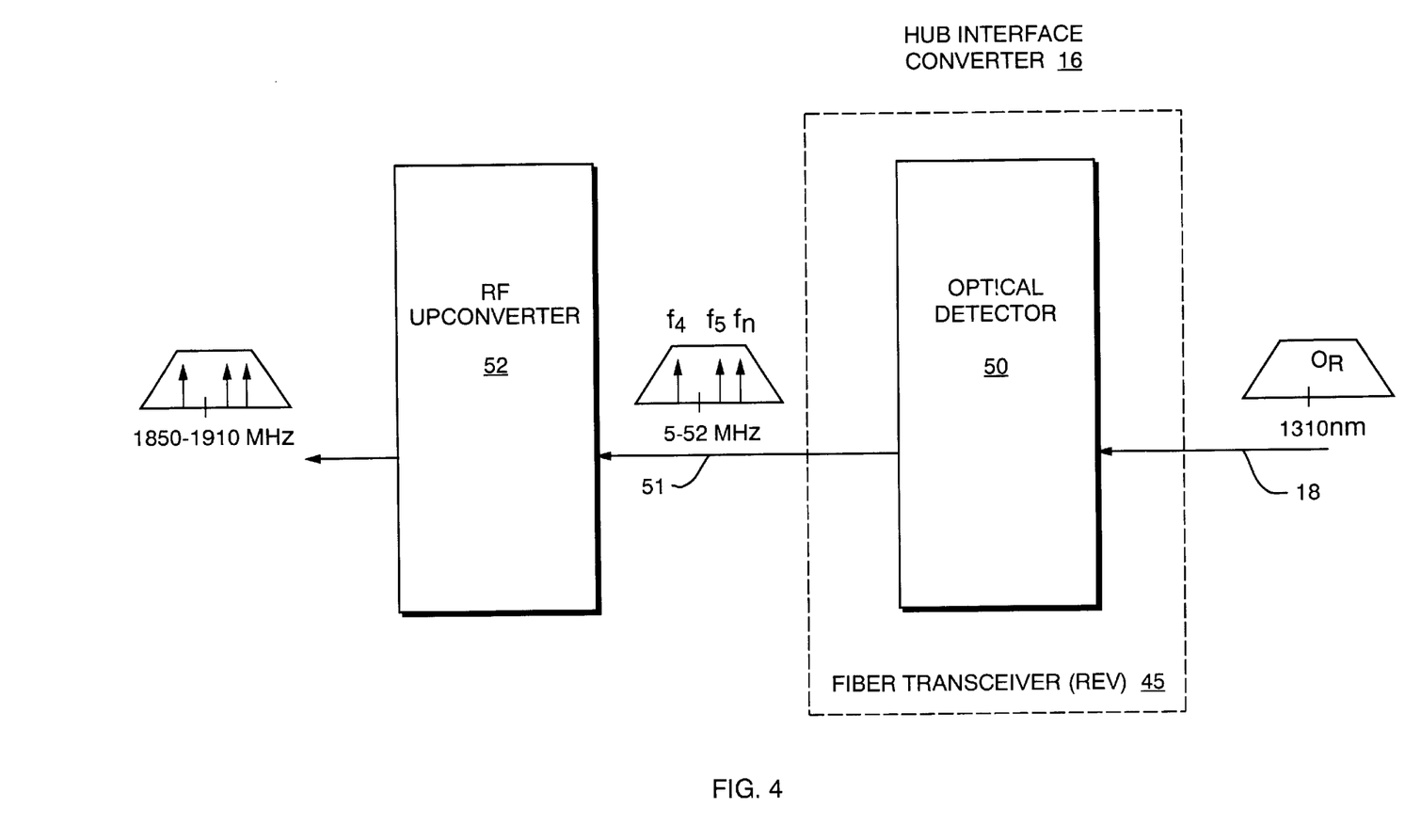
FIG. 4 is a more detailed block diagram of a reverse link direction portion of the system.

FIG. 4 shows the reverse direction portions of the HIC 16 in more detail. In particular, an optical detector 50 accepts signals from the fiber 18 as received from multiple CMIs 20 in the various sectors 24. Such signals may, for example, be optically modulated onto a single optical carrier within a wavelength range of 1310 nanometers. The optical detector 50 then provides a conversion of the energy in the optical band down to a convenient intermediate frequency (IF) band such as in the range from 5–52 MHZ. The optical detector 50 serves as the receiver or reverse link portion of the optical transceiver 45. The combined RF signal 51 produced by the optical detector 50 may therefore contain information at a number of carrier frequencies f4, f5, . . . , fm.

The RF upconverter 52 in turn translates such signals to a band within the PCS band used for reverse wireless transmission such as from 1850–1910 MHZ as suitable for coupling to the standardized base transceiver system 12.

Figure 5:
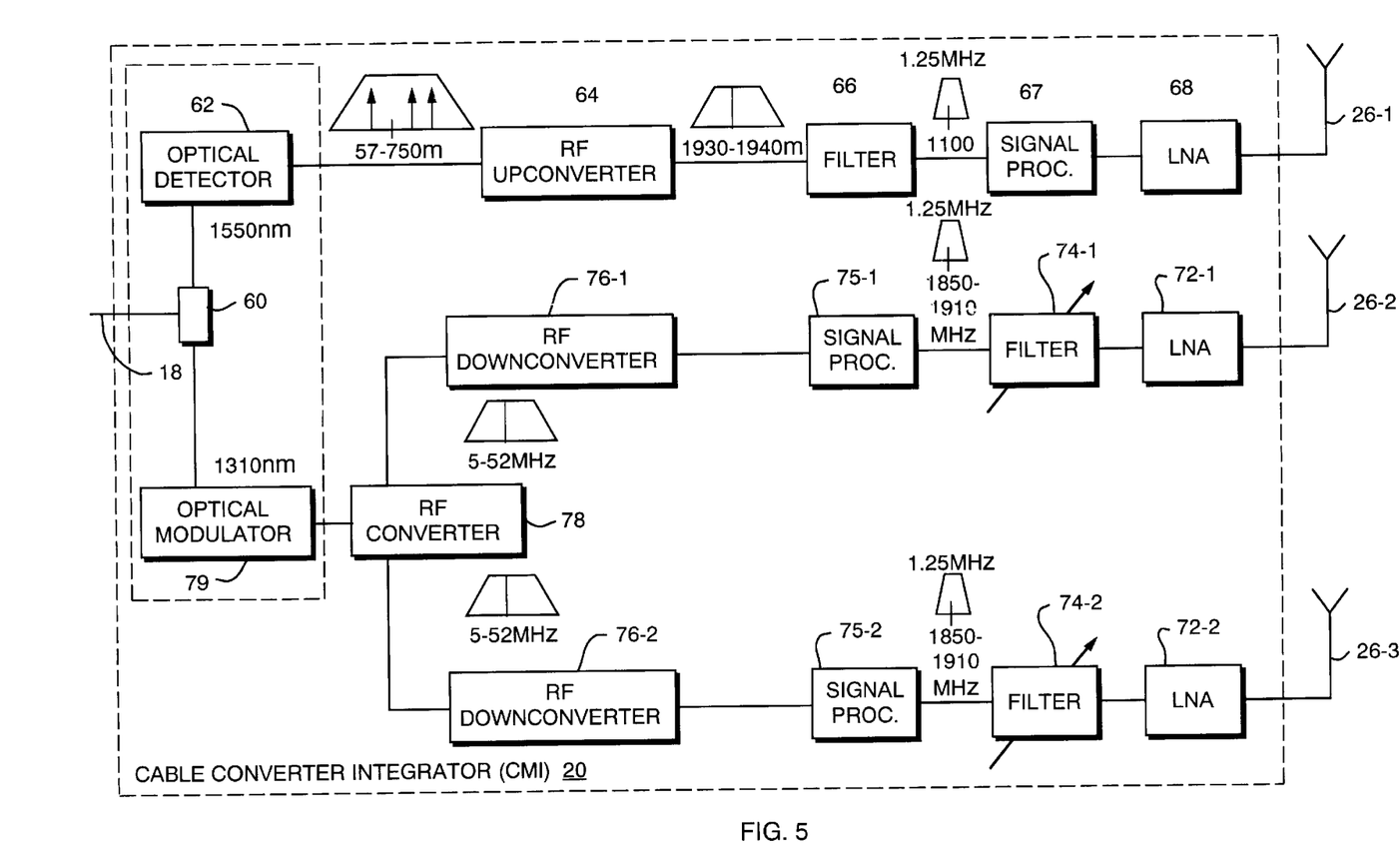
FIG. 5 is a more detailed block diagram of a Cable Microcell Integrator (CMI) deployed at an individual cell or sector location.

Turning attention to FIG. 5, the details of the CMI 20 on the forward link will now be addressed. The 1550 nm signal received from the optic fiber 18 is first fed to a splitter 60 to allow a portion of the optical energy to be fed to an optical detector 62. The optical detector 62 in the preferred embodiment accepts optical signals in a range of, for example, 1550 nanometers providing a detected signal in a 60 MHZ wide forward link band at the 57–750 MHZ IF carrier. This signal, which may contain the multiple RF carriers f1, f2, . . . , fn, codes or code phases as previously described, is then fed to the RF upconverter 64. The optical detector 62 and an optical modulator 79 provide an optical transceiver 80 for the CMI 20.

The output of the RF upconverter 64 is the radio frequency signal in the expected forward link range of from 1930–1990 MHZ. A filter 66 restricts the transmission bandwidth to the single channel frequency bandwidth of approximately 1.25 MHZ. A signal processor 67 may provide further filtering, automatic gain control, preamplification, or control signaling functions.

In the receive, or reverse link direction, signals received on the primary reception antenna 26-2 are first fed to a low noise amplifier 72-1 and filter 74-1. Such signals of interest are in the range of 1850–1910 MHZ which are the frequency band typically associated with reverse links in the PCS region. The filter 74-1 thus produces a band limited signal of 1.25 MHZ that may have multiple carriers, codes and/or phases as previously described. The signal processor 75-1 prepares such signals for RF down conversion to the IF band from 5–52 MHZ.

Signals for the secondary or diversity antenna 26-3 are fed through associated filter 74-2, signal processor 75-2, and RF down converter 76-2 which perform functions analogous to that of their associated counterparts 72-1, 74-1, 75-1, and 76-1 in the primary chain. In this instance, the RF down converter 76-2 provides a frequency shift which is different than that of RF down converter 76-1 but still within the band of 5–52 MHZ. This provides a system 10 with the ability to feed back a diversity antenna signal so that they can be properly processed by the receive side of the BTSs 12. The RF combiner 78 in turn accepts the signals from the RF down converter 76-1 and 76-2 and feeds them to an optical modulator 44 which upbands the information of interest to an optical carrier such as in the range of 1310 nanometers. The optical signal is then fed to the combiner 60 and back to the fiber 18.

It can now be understood how various components such as the HIC 16, single optical fiber cable 18, and cable microcell integrators 20 can be used to manage the transport of signals between the BTSs 12 and devices which radiate within respective sectors 24 or cells 22. Multiple CMIs 20 can thus be assigned to transmit and receive on the same radio frequency channels as a simulcast cluster. In comparison to a traditional distribution network where the full capacity of an RF channel is not fully utilized, the coverage area of a single RF channel may be extended through the simulcast of RF carriers over a common optical fiber. This provides a significant improvement in network efficiency and capacity control. Furthermore, by incorporating optical modulation and detection equipment entirely within the remote CMIs 20 themselves, the difficulties associated with previous hybrid distribution networks requiring the interconnection of both coaxial cables and optical fiber are avoided.

It should also be understood that the particular filters 66, 74-1, and 74-2 deployed in each CMI 20 are chosen to achieve the desired operational effect of the invention. In particular, the filters 66 and 74 need to be set to the appropriate RF carrier frequency so that the CMI simulcast clusters are appropriately implemented. For example, the filters 66 associated with given CMI cluster, such as the cluster 24-1, 24-2, 24-3, will each be tuned to the same RF carrier frequency. Likewise, the filters 74-1, 74-2 associated with such CMIs 20-1, 20-2, 20-3 intended to be part of a cluster are also tuned to the same carrier frequency.

Therefore, reconfiguration of the distribution network such as when a higher capacity system is desired, requires only reconfiguration of the filters 66 and 74. This may be carried out manually, by either implementing such filters as a tunable circuit that may be adjusted by a technician in the field with potentiometers or the like or in a more sophisticated system, it may be programmable such that they may be controlled by control signals provided over the optic fiber 18 and various dedicated control channels within the associated available bandwidth of operation.

Figure 6:
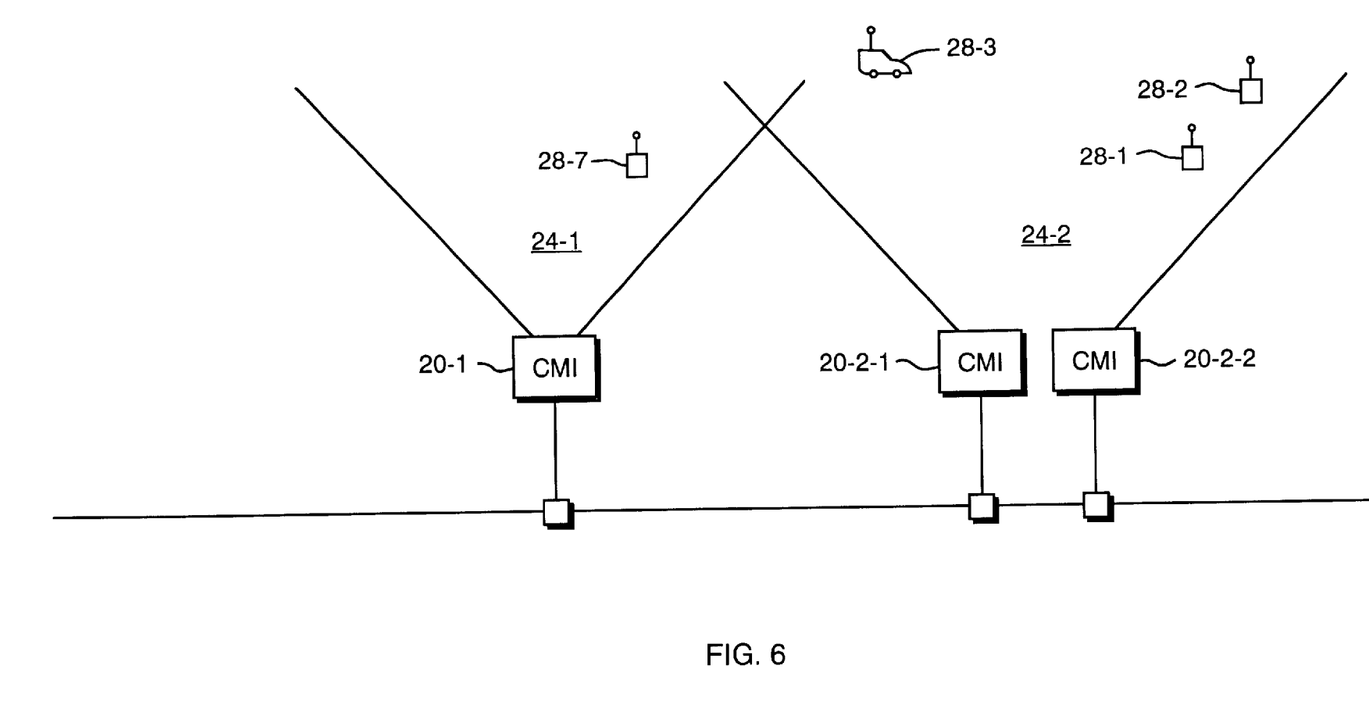
FIG. 6 is a diagram depicting two adjacent CMI sites with an auxiliary transceiver deployed in one of the adjacent sites.

Turning attention now to FIG. 6, the manner of switching from the simulcast mode to a mode in which multiple channels are active in each sector 24 can be described. As shown in this figure schematically, a first sector 24-1 is located adjacent to a second sector 24-2. The first sector 24-1 has at least one CMI 20-1 located within it for providing at least one radio channel at a given frequency, code and phase as previously described (f1, c1, p1). A second adjacent sector 24-2 has a first CMI 20-2-1, as well as an auxiliary or second CMI 20-2-2. The sectors 24-1 and 24-2 may, for example, be located along a highway which experiences a traffic demand that ebbs and flows for example during a rush hour.

In this configuration, the second CMI 20-2-2 is arranged to have the same RF coverage area, or footprint, as the first CMI 20-2-1, that is, to cover sector 24-2. This may be provided by summing the radio frequency outputs of the first and second CMI 20-2-1 and 20-2-2 to feed a common set of antennas 26. Alternatively, the first and second CMIs 20-2-1 and 20-2-2 may each be provided with their own RF final output stage and antenna system that is, for example, co-located on the same cell tower site.

Figure 7:
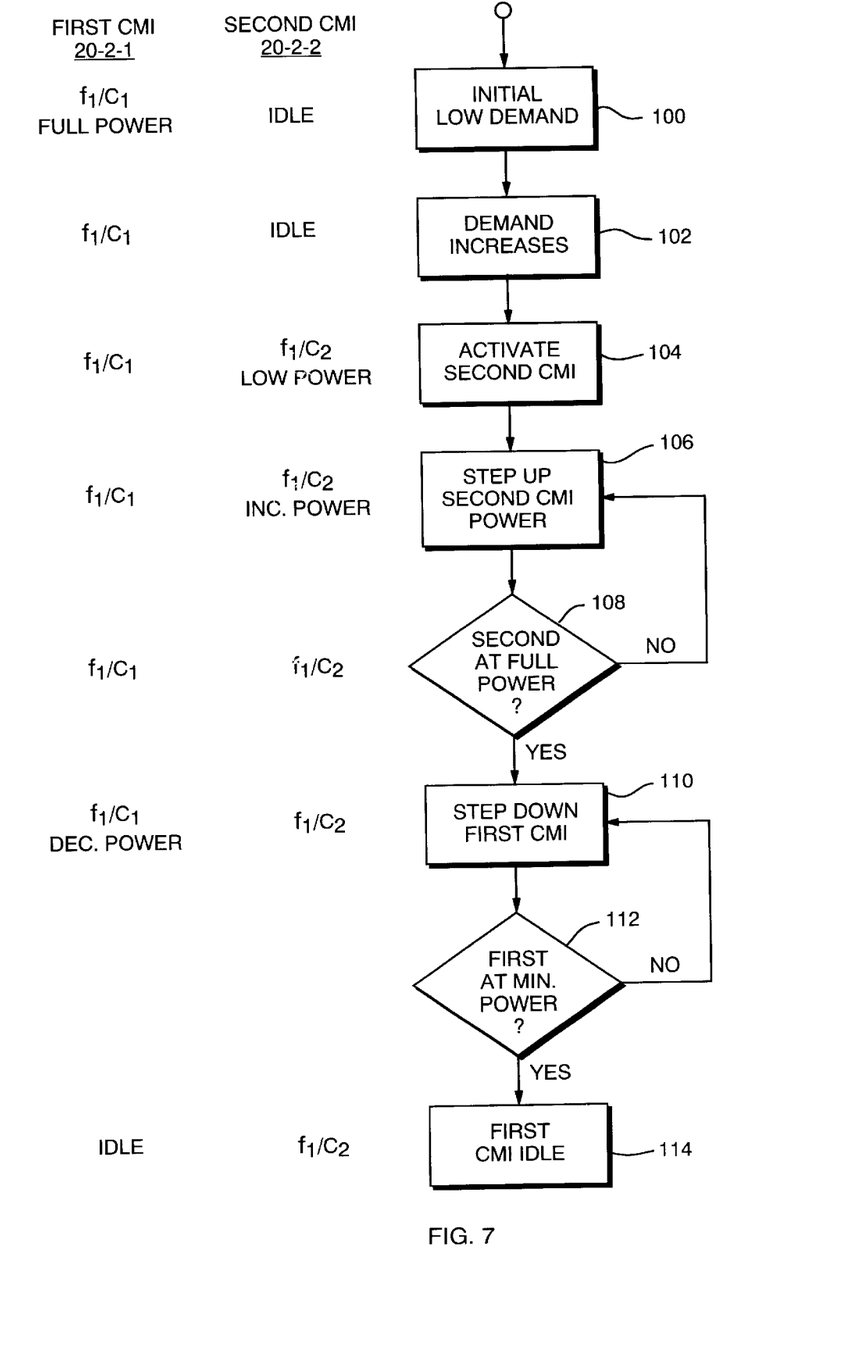
FIG. 7 is a flow chart of the steps performed at the HIC to affect a blossom operation.

Continuing now to refer to FIG. 6 in conjunction with the flow chart of FIG. 7, a process for blossoming the capacity of the sectors 24-1 and 24-2 will be described. In an initial state 100, the sector 24-2 is not particularly crowded and therefore it places an initial relatively low demand upon the system 10. At this point, as shown in the table to the left of the flow diagram, the first CMI 20-2-1 is operating with a first active radio channel such as by using a first carrier frequency f1 and first code and code phase c1. As explained above, this same channel is being simulcast by CMI 20-1 in the adjacent sector 24-1.

Eventually, the system reaches a state 102 in which demand increases. The system then begins to take steps to affect a graceful blossoming of the use of frequencies within the area serviced by the system 10. Now, entering a state 104, a second channel is activated within the second CMI 20-2-2 at a low power. The second channel may be provided at the same radio frequency with a different code or code phase or at a different radio frequency. At this point, certain ones of the mobile units located within the sector 24-2, such as mobile unit 28-1, will be located at some point sufficiently close to the CMI 20-2-2 to detect the second channel. This will cause the circuits within the mobile unit 28-1 to begin to enter their soft handoff mode which is normally only activated when the mobile unit 28-1 is moving into a new cell. However, in this instance, the mobile unit 28-1 may actually be stationary. In effect, this causes some of the mobile units such as unit 28-1 that are within the close capture range of the second CMI 20-2-2 to begin to operate on the second channel.

The system then enters a state 106 in which the power level of the second CMI 20-2-2 is incrementally increased to a full operating power level, gradually placing all mobiles into soft handoff. In state 110, the power level of the first CMI 20-2-1 is gradually decreased. Processing proceeds to step 112 to determine if the CMI 20-2-1 is at minimum power. If not, the system returns to state 110 until the first CMI 20-2-1 reaches its minimum power state. Thus, as the process loops through states 110 and 112, mobile units such as mobile unit 28-3 at the edge of the coverage area will complete their soft handoff operations. Eventually, even mobile unit 28-2 located near the center of the sector 24-2 will be switched to the new channel. Once minimum power is reached in state 108 for the first CMI 20-2-1, it enters an idle state in state 114.

Figure 8:
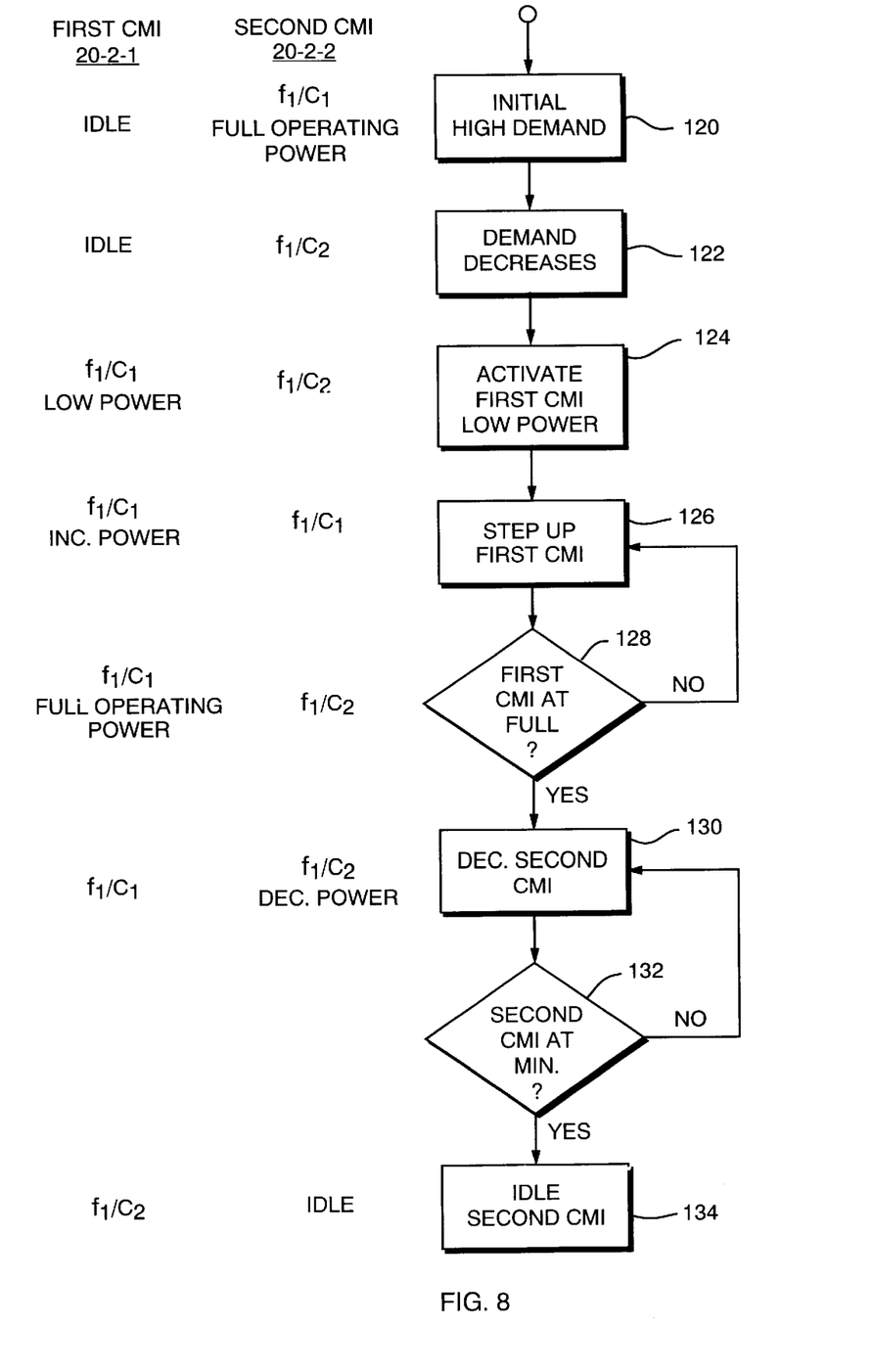
FIG. 8 is a flow chart of the steps performed at the HIC to affect a wilt operation.

Turning now to FIG. 8, the corresponding wilt process will be described. This process is entered into when the system 10 reaches a state in which traffic demand is decreasing, and it appears that it would be more advantageous for the CMI's operating on two different channels to enter a simulcast mode.

In first state 120, the system 10 is experiencing an initial high demand in which the radio channels used in the adjacent sectors 24-1 and 24-2 are different. However, a state 122 of lower demand is eventually entered as previously described in which it becomes desirable to have the sector 24-2 be in a simulcast mode sector 24-1.

Continuing to a state 124, the first CMI 20-2-1 (which was idle in state 127), is brought up at an initial lower power. At this point, certain close in mobile units, such as mobile unit 28-1, may begin to execute their soft handoff processing.

Entering a state 126, the power level of the first CMIs 20-2-1 is again stepped. In this instance, the power level of the carrier radio channel associated with the first CMI 20-2-1 is incrementally increased. Continuing to loop through states 126 and 128, certain mobile units, such as mobile unit 28-1, continue to execute their soft handoff processing, and eventually reach the point at which they will enter into soft handoff processing with both CMI 20-2-1 and CMI 20-2-2.

In state 130, CMI 20-2-2 is gradually decreased in power. This causes mobile units at the edge of the coverage area to cease soft handoff and be serviced only by CMI 20-2-1. Continuing through states 130 and 132, CMI 20-2-2 is then gradually decreased in power to reach a minimum power level state where all soft handoff operations also cease.

Finally, once the power level of the second CMI 20-2-2 is decremented in state 130 to a point at which it is at minimum power, a state 134 is entered in which the second CMI 20-2-2 is placed in an idle mode. The system 10 is thereby returned to a state in which the mobile units 28-1, 28-2, and 28-3 operating within the sector 24-2 are all using the same radio channel carriers as the mobile units 28-7 in the first sector 24-1.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A wireless communication system in which a plurality of cells are located substantially adjacent one another, the wireless communication system operating over a specified frequency range to provide signals in a forward direction from a central base transceiver station towards subscriber units located in the cells, the system comprising:

a hub interface converter, for accepting radio frequency signals from at least one base station, the radio frequency signals comprising at least one base station traffic signal modulated onto a radio frequency carrier (RF), for converting such radio frequency signals to a forward transport signal;

a distribution network for distributing the forward transport signal;

a plurality of cable integrators, each receiving the forward transport signal from the distribution network, with at least a first and second cable integrators associated with a given first one of the cells, and with a third cable integrator associated with an adjacent second one of the cells, each of the first, second and third cable integrators furthermore including a translator to translate the forward transport signal to corresponding transmit radio carrier signals; and a cable integrator controller, for controlling the transmit radio carrier signals on which the cable integrators operate such that in a low capacity mode, the transmit radio carrier signal active in the first cable integrator in the first cell is the same as the transmit radio carrier signal active in the third cable integrator in the second cell having the same radio carrier signal, and the second cable integrator being inactive, and such that to activate a higher capacity mode, the second cable integrator is gradually activated to an operating power level with a second transmit radio carrier signal after which the first cable integrator is gradually deactivated.

2. A system as in claim 1 wherein the cable integrator controller additionally controls the transmit radio carrier signals on which the cable integrators operate such that in the higher capacity mode, the second cable integrator is gradually deactivated to cease operation with the second transmit radio carrier signal after the first cable integrator has been gradually activated to an operating power level to reestablish operation with the first transmit radio carrier signal.

3. A system as in claim 1 wherein the distribution network uses an optical fiber, and the hub interface converter additionally comprises:

a plurality of radio frequency (RF) down converters, each RF down converter for translating radio frequency energy in a forward link radio frequency bandwidth including the radio frequency carrier to an output intermediate frequency signal at an intermediate frequency carrier;

an RF combiner for combining the output intermediate frequency signals from multiple RF down converters to produce a combined RF signal; and an optical modulator for upconverting the combined RF signal to produce the transport signal as an optical signal suitable for transmission over the optical fiber.

4. A system as in claim 1 wherein the cells are divided into sectors, and where the first, second, and third cable integrators are deployed in two or more adjacent cell sectors.

5. A system as in claim 1 wherein the cells are divided into microcells, and wherein the first, second, and third cable integrators are deployed in two or more adjacent microcells.

6. A system as in claim 1 wherein Code Division Multiple Access (CDMA) is used to modulate the traffic signals onto the radio carrier signals, and wherein the transmit radio signals in the two adjacent cells have a same pseudo random noise (PN) code.

7. A system as in claim 1 wherein Code Division Multiple Access (CDMA) is used to modulate the traffic signals onto the radio carrier signals, and wherein the transmit radio signals in the two adjacent cells have a same pseudo random noise (PN) code phase.

* * * * *